Patented Nov. 10, 1936

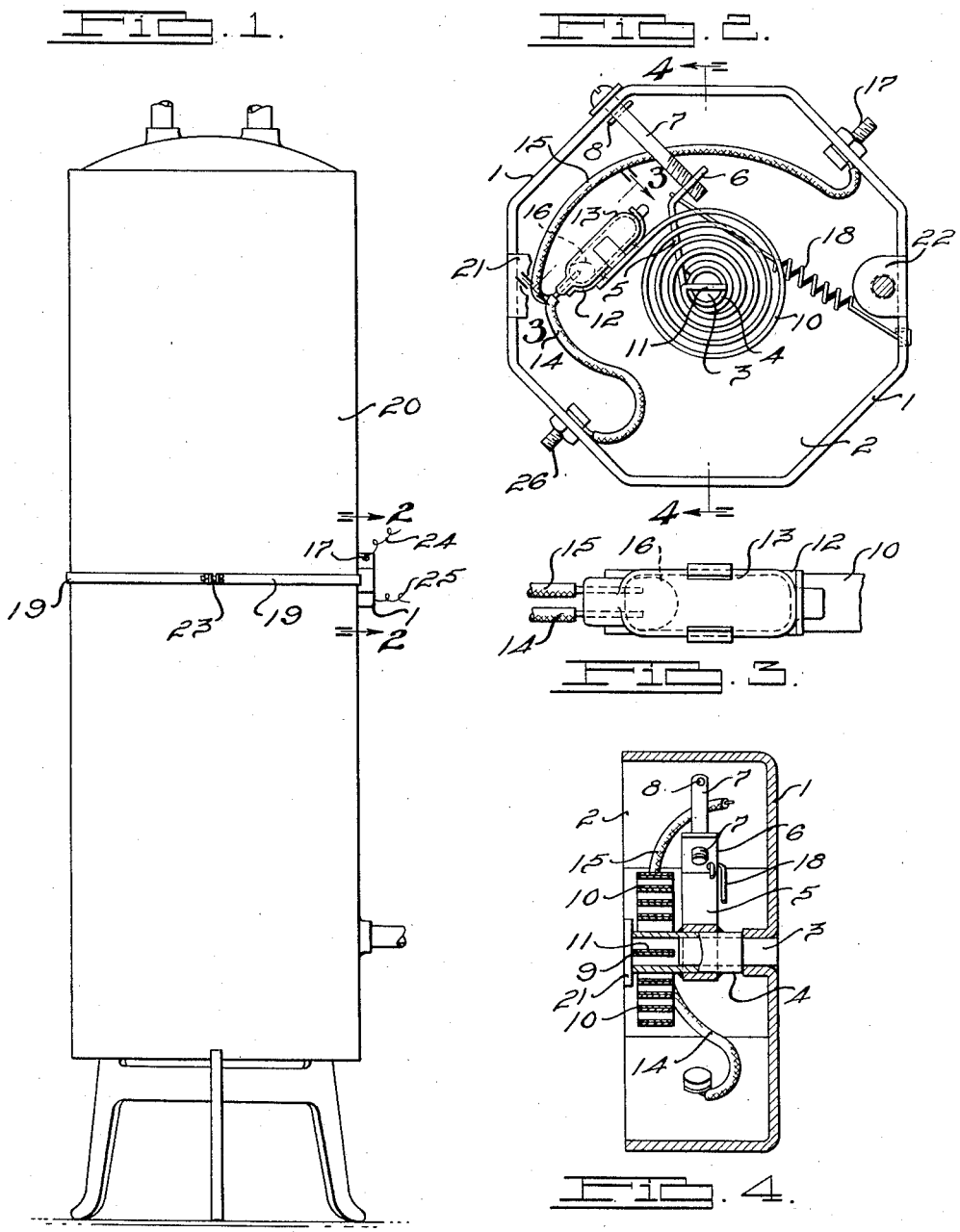

2,060,713

UNITED STATES PATENT OFFICE 2,060,713

THERMOSTATIC SWITCH

Judson W. Wright and Edgar H. Glinz,
Detroit, Mich.

Application March 1, 1935, Serial No. 8,797

3 Claims. (Cl. 200—138)

This invention relates to thermostatic switches and the object of the invention is to provide a thermostatic switch adapted for use in connection with a hot water tank and provided with a band by which the switch may be adjustably mounted at any point on the hot water tank to make or break an electric circuit in accordance with the temperature of the water within the tank at the point where the thermostatic switch is mounted.

Another object of the invention is to provide a thermostatic switch comprising a casing open on the side toward the tank and provided with a thermostatic element carrying a mercury switch which is turnable to the on or off position in accordance with the movement of the thermostatic element.

A further object of the invention is to provide a thermostatic switch including means for adjusting the thermostatic element in relation to the housing so as to act slowly or quickly as desired.

Another object of the invention is to provide a tube rotatably mounted on the stud and having a spiral thermostatic element mounted in the outer end thereof and an arm attached to the said tube and adjustable from the exterior of the housing to turn the tube and thermostatic element to the desired position.

These objects and the several novel features of the invention are hereinafter more fully described and claimed and the preferred form of construction by which these objects are attained is shown in the accompanying drawing in which—

Fig. 1 is an elevation of a hot water tank showing my thermostatic switch mounted thereon.

Fig. 2 is an enlarged section taken on line 2—2 of Fig. 1.

Fig. 3 is an enlarged view of the mercury switch taken on line 3—3 of Fig. 2.

Fig. 4 is a section taken on line 4—4 of Fig. 2.

As shown in Figs. 2 and 4, the switch housing 1 is provided with an open side 2 and a metal stud 3 is secured in the center of the housing 1. A tube 4 is rotatably mounted on this stud 3 and an arm 5 is provided, shown in Figs. 2 and 4, which extends around the tube 4 and is soldered or welded thereto. The upper end 6 of the arm 5 extends at an angle as shown and a screw 7 shown more particularly in Fig. 2 extends through the wall of the housing and is threaded into the end 6 of the arm 5. In order to prevent withdrawal of the screw 7 from the housing, a pin 8 is inserted through said screw. By means of the screw 7 on the arm 5 the tube 4 may be adjusted in position on the stud 3 as desired. As will be noted from Fig. 4, the tube 4 extends beyond the end of the stud 3 and is provided with a slot 9 in this extending end. A spiral thermostatic element 10 is provided and the inner end 11 of this thermostatic element is inserted through the slots 9 of the tube 4 and the tube is pinched in order to secure the thermostatic element in the end of the tube.

The opposite end of the thermostatic element is attached to a bracket 12 shown more particularly in Figs. 2 and 3 and this bracket carries a mercury switch tube 13 into which two electric terminals 14 and 15 extend. The air is withdrawn from this tube and a globule of mercury 16 is contained within the tube and is adapted to move to either end of the tube as the tube is tilted by the thermostatic element. In the position shown in Fig. 3 the globule 16 of mercury makes electrical contact between the terminals 14 and 15 but when the tube is tilted the other way, the mercury globule 16 moves to the other end of the tube 13 to break the electrical connection between said terminals. The terminal 14 is connected to a binding post 26 insulated from the housing 1, while the terminal 15 is connected to a binding post 17 which is also insulated from the housing 1. A spring 18 is connected at one end to the arm 5 and at the opposite end to the housing and maintains the arm 5 and screw 7 under a slight tension to prevent looseness of the parts.

A metal band 19 extends about the water tank 20 and the opposite ends of the band are connected to the ears 21 and 22 formed on the inner edge of the housing 1. This band 19 is provided with an adjusting screw 23 so that the band and thermostatic switch may be adjusted in position on the water tank 20.

If it is desired to maintain the water tank half full of water, the band 19 is positioned at about the center of the tank, as shown in Fig. 1, and this band will hold the open side of the housing 1 against the exterior of the tank. Wires 24 and 25 may be connected to the binding posts 26 and 17 of the housing and, though not here shown, these wires are preferably connected in an electric circuit for controlling a solenoid valve to supply gas for heating the water in the water tank 20. When the circuit is closed, the gas supply is turned on to heat the water and the parts remain in the position shown in Fig. 2 with the globule of mercury making electrical contact between the terminals 15 and 16. As the water in the tank is heated, the water in the top of the tank is first heated and as additional hot water is added thereto the lower edge of the heated volume moves downwardly. When the upper half of the tank is filled with hot water, the heat is transferred to the thermostatic element 11 which is in close proximity to the exterior of the tank. This expands the thermostatic element 11 thus turning the tube 13 in a clockwise direction until the tube is tilted sufficiently to allow the globule of mercury 16 to move by gravity to the other end of the tube 13. This breaks the electrical contact between the terminals 14 and 15 and thus breaks the electrical circuit and allows the solenoid gas valve (not here shown) to close and shut off the supply of gas to the heating burner.

The thermostatic switch will remain in the off position until hot water is used out of the tank, at which time, the top of the cold water from the bottom of the tank will move upwardly allowing the thermostatic element to cool and turn back to the original position shown in Fig. 2 to close the circuit and again turn on the gas burner. By means of the screw 7 the tube 4 and thermostatic element 10 may be adjusted in position relative to the stud 3. By this arrangement, the switch can be so adjusted that a very slight expansion of the thermostatic element will turn the tube to break the circuit and any adjustment desired may be produced by threading the screw 7 to a greater or less extent through the end 6 of the arm 5.

From the foregoing description it becomes evident that the device is very simple and efficient in operation, will not easily get out of order, is composed of few parts and is of consequent low manufacturing cost and provides a device which accomplishes the objects described.

Having thus fully described our invention, its utility and mode of operation, what we claim and desire to secure by Letters Patent of the United States is—

1. In a thermostatic switch, a housing provided with a stud, a tube rotatably mounted on the stud, an arm secured to the tube, the arm being arranged for turning the tube on the stud, an adjusting screw rotatably mounted in the housing and threaded through the end of the arm, a thermostatic element comprising a bimetallic blade arranged in a flat spiral coil and having its inner end secured to the end of the tube, a mercury switch mounted on the outer end of the thermostatic element, the mercury switch comprising a straight glass tube of short length having a pair of terminals in one end and a globule of mercury movable into engagement with the terminals when the tube is tilted in one direction by the thermostat and movable away from the terminals when the tube is tilted in the opposite direction by the thermostat.

2. In a thermostatic switch, a housing provided with an open side, a stud supported on the closed side of the housing and extending toward the open side thereof, a tube rotatably mounted on the stud, an arm secured to the tube, an adjusting screw rotatably mounted in the housing and threaded through the end of the arm, a spiral thermostatic element comprising a bimetallic blade having its inner end secured in the end of the tube, a mercury switch secured to the outer end of the thermostatic element, the housing being arranged to be supported with the open side of the housing against the surface of a water tank.

3. In a thermostatic switch, a housing provided with a stud in the center, a tube rotatably mounted on the stud, an arm secured to the tube, an adjusting screw rotatably mounted in the housing and threaded through the end of the arm, a thermostatic element comprising a bimetallic blade of flat spiral form having its inner end secured in the end of the tube and its outer end unsupported and free to move, and a mercury switch mounted on the outer free end of the thermostatic element.

JUDSON W. WRIGHT.
EDGAR H. GLINZ.